United States Patent
Scholl et al.

[15] 3,694,507
[45] Sept. 26, 1972

[54] PROCESS FOR THE PREPARATION OF PERFLUORO-2,5-DIAZAHEXA-2,4-DIENE

[72] Inventors: Hans-Joachim Scholl, Cologne; Erich Klauke, Odenthal-Hahnenberg, both of Germany

[73] Assignee: Farbenfabriken Bayer Aktiengesellschaft, Leverkusen, Germany

[22] Filed: March 11, 1971

[21] Appl. No.: 123,475

[30] Foreign Application Priority Data

March 20, 1970 Germany..........P 20 13 433.2

[52] U.S. Cl..............................260/566 D, 424/325
[51] Int. Cl.............................................C07c 119/00

[58] Field of Search...................................260/566 D

[56] References Cited

UNITED STATES PATENTS 3,660,511    5/1972    Ogden....................260/566 R

*Primary Examiner*—Leon Zitver
*Assistant Examiner*—Gerald A. Schwartz
*Attorney*—Burgess, Dinklage & Sprung

[57] ABSTRACT

Perfluoro-2,5-diazahexa-2,4-diene ($CF_3-N=CF-CF=N-CF_3$) is prepared by reacting N,N'-bis(trifluoromethyl) tetrafluoroethylene diamine ($CF_3-NH-CF_2-CF_2-NH-CF_3$) with sodium fluoride at about 20° to about 70° C.

4 Claims, No Drawings

PROCESS FOR THE PREPARATION OF PERFLUORO-2,5-DIAZAHEXA-2,4-DIENE

BACKGROUND

The present invention relates to a new process for the preparation of perfluoro-2,5-diazahexa-2,4-diene.

The process of the invention may be represented by the following reaction scheme:

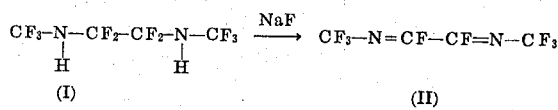

Perfluoro-2,5-diazahexa-2,4-diene (II) is already known (J.Am.Chem.Soc. 89, 3868 (1967). It has been obtained in moderate yields by UV-irradiation followed by $F^{\ominus}$ catalysed isomerization of tetrafluoro-2,3-diaza-1,3-butadiene (III), in the presence of difluorodiazirine or tetrafluoroethylene, as demonstrated for example by the following equations:

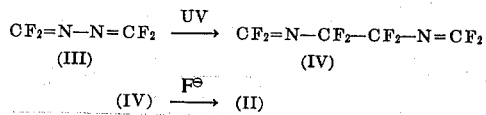

Tetrafluorodiazabutadiene (III) which was used as starting material was obtained in 33 percent yield by a difficult process from tetrabromo-2,3-diaza-1,3-butadiene (V) by fluorination with AgF (J. Org.Chem. 31 3833 (1966)).

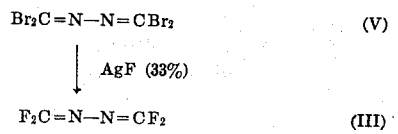

It is clear from the description of this known reaction method that it does not constitute a large scale feasible process. The process according to the invention, on the other hand, involves a technically feasible reaction and a readily available starting compound.

SUMMARY

The present invention relates to a technically very simple process for the preparation of perfluoro-2,5-diazahexa-2,4-diene by reacting N,N'-bis(trifluoromethyl)-tetrafluoroethylene-diamine with at least the stoichiometrically required quantity of sodium fluoride at about 20° to about 70° C.

DESCRIPTION

It is already known that 1 mol of HF can be split off from secondary N-trifluoromethyl-monoamines (J.Gen.Chem.USSR (English translation) 29, 2662 (1969)). The dehydrofluorination is carried out with KF at 150° C. Compounds which contain terminal difluoromethylene imino groups, so-called isocyanide difluorides, are obtained. If this method was applied to N,N'-bis(trifluoromethyl)tetrafluoroethylenediamine, it would be expected that the bis-isocyanide difluoride of tetrafluoroethylene-diamine (IV) would be formed as follows:

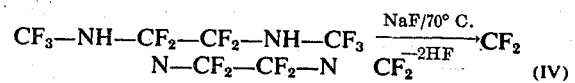

The process according to the invention, however, surprisingly does not give rise to the expected compound (IV) but gives rise to compound II in a practically quantitative yield and in a high degree of purity:

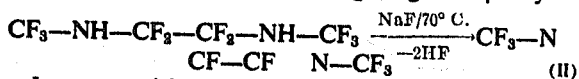

It was surprising to find that the reaction takes place in the temperature range of about 20° C to about 70° C, preferably about 50° to about 70° C, even though sodium fluoride was used, which is a much weaker base than potassium fluoride.

In a preferred embodiment of the process of the invention, the reaction is carried out at boiling point of the reaction mixture. If, however, the reaction is carried out in the lower temperature range, e.g., at 40°C, the product is worked up by distillation in the usual manner after completion of the reaction.

As a general rule, the starting compound is mixed with at least an equi-quantity of NaF but preferably a one to two-fold excess is applied, and by refluxing the reaction mixture the diazadiene produced is distilled off continuously from the head of a small column. The diazadiene prepared by the method according to the invention is substantially free from impurities and isomers and need not to be further purified. It is a clear, colorless liquid of boiling point 56°C/760 mm Hg, $n_D^{20}$: 1.2908.

Perfluoro-2,5-diazahexa-2,4-diene is an intermediate product for organic syntheses J. Chem. Soc. London (C) 2302 (1967)) and can be used as an insecticide. When applied in a concentration of 0.2 percent (dissolved in a mixture of acetone/water), after 3 days 100 percent of phaedon cochleariae and 80 percent of *plutella maculipennis* are killed. After 2 days 80 percent of *tetranychus articae* are also killed by administering the above mentioned 0.2 percent solution of perfluoro-2,5-diazahexa-2,4-diene.

EXAMPLE 1

One hundred and sixty-eight g of NaF and 139 g of N,N'-bis(trifluoromethyl)tetrafluoroethylene-diamine are introduced into a carefully dried three-necked flask equipped with thermometer, stirrer and a small distillation column. The reaction mixture is heated to 70° C with stirring and the distillate is removed continuously from the head of the column at a temperature of 56°–57 C. 109 g (=95 percent of the theory) of perfluoro-2,5-diazahexa-2,4-diene which has a viscosity of $n_D^{20} = 1.2908$ are obtained in this way in about 4 hours.

| 19-F-NMR: | $CF_3$ groups doublet at (standard $CF_3$ COOH ext.) | 18.5 ppm |
| --- | --- | --- |
| | CF groups multiplet | 51.1 ppm. |

The starting compound was obtained as follows:

Nine hundred ml of HF are passed at about 0° C into 800 g of tetrachloroethylene bis-isocyanide dichloride (Angew.Chemie 74, 853 (1962) and 80, 952 (1968)) in a 2 liter stainless steel autoclave which is equipped with stirrer, thermometer and reflux cooler with waste gas control valve attached.

The autoclave is sealed and nitrogen is forced in to a pressure of 3 excess atmospheres as protective gas and the reaction mixture is heated to 70° C for 1 hour. The reaction is left to continue for 1 hour at 70° C and the HCl liberated in the reaction is released through the exhaust gas valve at a pressure of 6 excess atmospheres. The autoclave is then heated to 100° C for the remaining reaction, the reaction being left to run to its completion at a pressure adjusted to be released when reaching 12–13 excess atmospheres. After cooling, the reaction product is distilled over an efficient column. After first runnings of excess HF, 470 g of N,N'-bis(trifluoromethyl)tetrafluoroethylene-diamine (I) of Bp 70°–72°C, $n_D^{20}$: 1.2778, are obtained.

In the 19–F–NMR, a multiplet for the $CF_3$ groups appears at −22.1 ppm and for the $CF_2$ groups at +19.3 ppm (standard $CF_3COOH$ ext.).

EXAMPLE 2

Thirty-three g of NaF and 54 g of N,N'-bis(trifluoromethyl)tetrafluoroethylene-diamine are stirred for 20 hours at 40°C in a dried three-necked flask equipped with thermometer, stirrer and small distillation column. The distillate is then removed continuously from the head of the column at a temperature of 56°–57°C. 37 g (80 percent of the theory) of perfluoro-2,5-diazahexa-2,4-diene are obtained in about 30 minutes.

What we claim is:

1. A process for the preparation of perfluoro-2,5-diaza-hexa-2,4-diene which comprises reacting N,N'-bis(trifluoromethyl)tetrafluoroethylene-diamine with at least an equi-molar quantity of sodium fluoride at a temperature of from about 20° C to about 70° C.

2. A process as claimed in claim 1 in which the reaction is carried out at a temperature of from about 50° C to about 70° C.

3. A process as claimed in claim 1 in which the reaction is carried out by refluxing the reaction mixture.

4. A process as claimed in claim 1 in which the sodium fluoride is employed in a molar quantity of up to a two-fold excess.

* * * * *

UNITED STATES PATENT OFFICE
CERTIFICATE OF CORRECTION

Patent No. 3,694,507　　　　　　　Dated Sept. 26, 1972

Inventor(s) HANS-JOACHIM SCHOLL and ERICH KLAUKE

It is certified that error appears in the above-identified patent and that said Letters Patent are hereby corrected as shown below:

Column 1, lines 66-67, the formula should be

--  --

Column 2, lines 5-7, the formula should be

-- 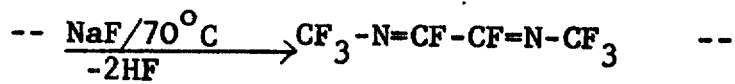 --

Signed and sealed this 24th day of April 1973.

(SEAL)
Attest:

EDWARD M. FLETCHER, JR.　　　　　ROBERT GOTTSCHALK
Attesting Officer　　　　　　　　Commissioner of Patents